United States Patent
Raghavan et al.

(10) Patent No.: US 12,001,872 B2
(45) Date of Patent: Jun. 4, 2024

(54) OBJECT TIERING FROM LOCAL STORE TO CLOUD STORE

(71) Applicant: Nutanix, Inc., San Jose, CA (US)

(72) Inventors: Ajaykrishna Raghavan, Santa Clara, CA (US); Biswa Ranjan Panda, Union City, CA (US); Bharath Kumar, Santa Clara, CA (US); Karan Gupta, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 498 days.

(21) Appl. No.: 17/357,300

(22) Filed: Jun. 24, 2021

(65) Prior Publication Data

US 2022/0114006 A1 Apr. 14, 2022

Related U.S. Application Data

(60) Provisional application No. 63/091,420, filed on Oct. 14, 2020.

(51) Int. Cl.
*G06F 9/44* (2018.01)
*G06F 9/455* (2018.01)

(52) U.S. Cl.
CPC .............. *G06F 9/45558* (2013.01); *G06F 2009/45595* (2013.01)

(58) Field of Classification Search
CPC ........................................... G06F 9/45558
(Continued)

(56) References Cited

U.S. PATENT DOCUMENTS

| 5,802,309 A | 9/1998 | Cook et al. |
| 6,209,128 B1 | 3/2001 | Gerard et al. |

(Continued)

FOREIGN PATENT DOCUMENTS

| CN | 113406169 A | 9/2021 |
| EP | 4 006 737 A1 | 6/2022 |

(Continued)

OTHER PUBLICATIONS

Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.

(Continued)

*Primary Examiner* — Timothy A Mudrick
(74) *Attorney, Agent, or Firm* — Foley & Lardner LLP (57) ABSTRACT

An object tiering system transfers or tiers data objects from a data store to a cloud store. The system includes a processor and a memory having stored instructions that, when executed by the processor, cause the processor to ingest a first plurality of data objects in the data store, map a second plurality of data objects having a common tiering date to a region, and upon reaching the common tiering date, transfer the region to the cloud store. In some embodiments, the mapping is done a priori when each data object is ingested or at a first time before the common tiering date. In some embodiments, the common tiering date is a second time for transferring the second plurality of data objects from the data store to the cloud store. In some embodiments, the first plurality of objects includes the second plurality of objects.

20 Claims, 6 Drawing Sheets

(58) Field of Classification Search
USPC .......................................................... 718/1
See application file for complete search history.

(56) References Cited

U.S. PATENT DOCUMENTS

| | | | |
|---|---|---|---|
| 6,775,673 B2 | 8/2004 | Mahalingam et al. |
| 7,395,279 B2 | 7/2008 | Iyengar et al. |
| 7,461,912 B2 | 12/2008 | Kamiyama et al. |
| 7,653,668 B1 | 1/2010 | Shelat et al. |
| 7,685,109 B1 | 3/2010 | Ransil et al. |
| 7,721,044 B1 | 5/2010 | Chatterjee et al. |
| 8,019,732 B2 | 9/2011 | Paterson-Jones et al. |
| 8,166,128 B1 | 4/2012 | Faulkner et al. |
| 8,250,033 B1 | 8/2012 | De Souter et al. |
| 8,312,027 B2 | 11/2012 | Lamb et al. |
| 8,352,424 B2 | 1/2013 | Zunger et al. |
| 8,549,518 B1 | 10/2013 | Aron et al. |
| 8,554,724 B2 | 10/2013 | Zunger |
| 8,601,473 B1 | 12/2013 | Aron et al. |
| 8,683,112 B2 | 3/2014 | Drobychev et al. |
| 8,799,222 B2 | 8/2014 | Marathe et al. |
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 8,997,088 B2 | 3/2015 | Gurikar et al. |
| 9,003,335 B2 | 4/2015 | Lee et al. |
| 9,009,106 B1 | 4/2015 | Aron et al. |
| 9,043,372 B2 | 5/2015 | Makkar et al. |
| 9,043,567 B1 | 5/2015 | Modukuri et al. |
| 9,052,942 B1 | 6/2015 | Barber et al. |
| 9,069,708 B2 | 6/2015 | Gill et al. |
| 9,069,983 B1 | 6/2015 | Nijjar |
| 9,110,882 B2 | 8/2015 | Overell et al. |
| 9,256,498 B1 | 2/2016 | Leibowitz et al. |
| 9,336,132 B1 | 5/2016 | Aron et al. |
| 9,342,253 B1 | 5/2016 | Muthukkaruppan et al. |
| 9,350,623 B2 | 5/2016 | Shadi et al. |
| 9,405,806 B2 | 8/2016 | Lysne et al. |
| 9,652,265 B1 | 5/2017 | Narayanasamy et al. |
| 9,705,970 B2 | 7/2017 | Pomerantz et al. |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2 | 6/2018 | Shetty et al. |
| 10,095,549 B1 | 10/2018 | Needham et al. |
| 10,120,902 B2 | 11/2018 | Erdogan et al. |
| 10,152,428 B1 | 12/2018 | Alshawabkeh et al. |
| 10,176,225 B2 | 1/2019 | Naidu et al. |
| 10,296,255 B1 | 5/2019 | Tummala |
| 10,380,078 B1* | 8/2019 | Kumar ................. G06F 3/0683 |
| 10,409,837 B1 | 9/2019 | Schmidt et al. |
| 10,430,084 B2* | 10/2019 | Goss ................. G06F 12/0238 |
| 10,528,262 B1 | 1/2020 | Shmuylovich et al. |
| 10,565,230 B2 | 2/2020 | Zheng et al. |
| 10,592,495 B1 | 3/2020 | Shami et al. |
| 10,659,520 B1 | 5/2020 | Sethuramalingam et al. |
| 10,691,464 B1 | 6/2020 | Drego et al. |
| 10,725,826 B1 | 7/2020 | Sagar et al. |
| 10,740,302 B2 | 8/2020 | Slik et al. |
| 10,747,752 B2 | 8/2020 | Krishnaswamy et al. |
| 10,802,975 B2 | 10/2020 | Gottin et al. |
| 10,915,497 B1 | 2/2021 | Bono et al. |
| 11,099,938 B2 | 8/2021 | Desai et al. |
| 2001/0034733 A1 | 10/2001 | Prompt et al. |
| 2002/0065776 A1 | 5/2002 | Calder et al. |
| 2002/0078065 A1 | 6/2002 | Agulhon |
| 2003/0023587 A1 | 1/2003 | Dennis et al. |
| 2003/0145310 A1 | 7/2003 | Thames et al. |
| 2003/0172094 A1 | 9/2003 | Lauria et al. |
| 2003/0191745 A1 | 10/2003 | Jiang et al. |
| 2004/0186826 A1 | 9/2004 | Choi et al. |
| 2005/0273571 A1 | 12/2005 | Lyon et al. |
| 2006/0041661 A1 | 2/2006 | Erickson et al. |
| 2006/0047636 A1 | 3/2006 | Mohania et al. |
| 2006/0080646 A1 | 4/2006 | Aman |
| 2006/0161704 A1 | 7/2006 | Nystad et al. |
| 2007/0088744 A1 | 4/2007 | Webber et al. |
| 2008/0034307 A1 | 2/2008 | Cisler et al. |
| 2009/0171697 A1 | 7/2009 | Glauser et al. |
| 2009/0327621 A1 | 12/2009 | Kliot et al. |
| 2010/0042673 A1 | 2/2010 | Dayley |
| 2010/0050173 A1 | 2/2010 | Hensbergen |
| 2011/0082962 A1 | 4/2011 | Horovitz et al. |
| 2011/0137966 A1 | 6/2011 | Srinivasan et al. |
| 2011/0185355 A1 | 7/2011 | Chawla et al. |
| 2011/0213884 A1 | 9/2011 | Ferris et al. |
| 2011/0258297 A1 | 10/2011 | Nightingale et al. |
| 2012/0096052 A1 | 4/2012 | Tolia et al. |
| 2012/0096205 A1 | 4/2012 | Velayudhan et al. |
| 2012/0210095 A1 | 8/2012 | Nellans et al. |
| 2012/0293886 A1 | 11/2012 | Abe et al. |
| 2012/0331065 A1 | 12/2012 | Aho et al. |
| 2012/0331243 A1 | 12/2012 | Aho et al. |
| 2013/0054523 A1 | 2/2013 | Anglin et al. |
| 2013/0103884 A1 | 4/2013 | Cho |
| 2013/0198472 A1 | 8/2013 | Fang et al. |
| 2013/0246431 A1 | 9/2013 | Ahuja et al. |
| 2013/0332608 A1 | 12/2013 | Shiga et al. |
| 2014/0279838 A1 | 9/2014 | Tsirogiannis et al. |
| 2014/0282626 A1 | 9/2014 | Muguda |
| 2014/0339117 A1 | 11/2014 | Quan et al. |
| 2014/0379840 A1 | 12/2014 | Dao |
| 2015/0012571 A1 | 1/2015 | Powell et al. |
| 2015/0046586 A1 | 2/2015 | Zhang et al. |
| 2015/0046600 A1 | 2/2015 | Kim |
| 2015/0079966 A1 | 3/2015 | Govindarajeswaran et al. |
| 2015/0208985 A1 | 7/2015 | Huang |
| 2015/0254325 A1 | 9/2015 | Stringham |
| 2015/0286413 A1* | 10/2015 | Olson .................. G06F 16/119 |
| | | | 711/112 |
| 2015/0378767 A1 | 12/2015 | Tarasuk-Levin et al. |
| 2016/0048408 A1 | 2/2016 | Madhu et al. |
| 2016/0092326 A1 | 3/2016 | Wu et al. |
| 2016/0117226 A1 | 4/2016 | Hetrick et al. |
| 2016/0162547 A1 | 6/2016 | Morris |
| 2016/0188407 A1 | 6/2016 | Bronnikov et al. |
| 2016/0207673 A1 | 7/2016 | Shlonsky et al. |
| 2016/0275125 A1 | 9/2016 | Drobychev et al. |
| 2016/0306643 A1 | 10/2016 | Klee et al. |
| 2017/0075909 A1 | 3/2017 | Goodson et al. |
| 2017/0091235 A1 | 3/2017 | Yammine et al. |
| 2017/0109421 A1 | 4/2017 | Stearn et al. |
| 2017/0235764 A1 | 8/2017 | Sharpe et al. |
| 2017/0235818 A1 | 8/2017 | Gorski et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0165161 A1 | 6/2018 | Slater et al. |
| 2018/0205791 A1 | 7/2018 | Frank et al. |
| 2018/0292999 A1 | 10/2018 | Nadkarni |
| 2018/0349463 A1 | 12/2018 | Bernhardy et al. |
| 2019/0004863 A1 | 1/2019 | Mainali et al. |
| 2019/0050296 A1 | 2/2019 | Luo et al. |
| 2019/0102256 A1 | 4/2019 | Murphy |
| 2019/0196885 A1 | 6/2019 | Song et al. |
| 2019/0207929 A1 | 7/2019 | Koorapati et al. |
| 2019/0213175 A1 | 7/2019 | Kong et al. |
| 2019/0213179 A1 | 7/2019 | McHugh et al. |
| 2019/0227713 A1 | 7/2019 | Parthasarathy |
| 2019/0243547 A1 | 8/2019 | Duggal et al. |
| 2019/0286465 A1 | 9/2019 | Cui et al. |
| 2019/0324874 A1 | 10/2019 | Gill et al. |
| 2019/0354544 A1 | 11/2019 | Hertz et al. |
| 2019/0370043 A1 | 12/2019 | Olderdissen |
| 2019/0370362 A1 | 12/2019 | Mainali et al. |
| 2019/0384678 A1 | 12/2019 | Samprathi et al. |
| 2019/0391843 A1 | 12/2019 | Franciosi et al. |
| 2020/0004570 A1 | 1/2020 | Glade et al. |
| 2020/0036787 A1 | 1/2020 | Gupta et al. |
| 2020/0042364 A1 | 2/2020 | Kumar Shimoga Manjunatha et al. |
| 2020/0104222 A1 | 4/2020 | Ramamoorthi et al. |
| 2020/0117637 A1 | 4/2020 | Roy et al. |

(56) References Cited

U.S. PATENT DOCUMENTS

| | | | |
|---|---|---|---|
| 2020/0195743 A1 | 6/2020 | Jiang et al. |
| 2020/0201724 A1 | 6/2020 | Saito et al. |
| 2020/0250044 A1 | 8/2020 | Sharma et al. |
| 2020/0310859 A1 | 10/2020 | Gupta et al. |
| 2020/0310980 A1 | 10/2020 | Gupta et al. |
| 2020/0311116 A1 | 10/2020 | Anvaripour et al. |
| 2020/0314174 A1 | 10/2020 | Dailianas et al. |
| 2020/0319909 A1 | 10/2020 | Jawahar et al. |
| 2020/0387510 A1 | 12/2020 | Ransil et al. |
| 2020/0394078 A1 | 12/2020 | Taneja et al. |
| 2021/0026661 A1 | 1/2021 | Sulcer et al. |
| 2021/0034350 A1 | 2/2021 | Chen et al. |
| 2021/0072917 A1 | 3/2021 | Surla et al. |
| 2021/0124651 A1 | 4/2021 | Srinivasan et al. |
| 2021/0181962 A1 | 6/2021 | Dai et al. |
| 2021/0294499 A1 | 9/2021 | Wang et al. |
| 2021/0406224 A1 | 12/2021 | Neufeld et al. |
| 2022/0067011 A1 | 3/2022 | Yue et al. |

FOREIGN PATENT DOCUMENTS

| | | |
|---|---|---|
| WO | WO-2020/146043 A1 | 7/2020 |
| WO | WO-2021/119546 A1 | 6/2021 |
| WO | WO-2021/232109 A1 | 11/2021 |

OTHER PUBLICATIONS

OpenStack. OpenStack Object Storage API V1 Reference—API V1.<https://docs.huinoo.com/openstack/archive/api/openstack-object-storage/1.0/os-objectstorage-devguide-1.0.pdf>.2014. (Year: 2014).
Rivkind, Yael. Object Storage: Everything You Need to Know. <https://lakefs.io/blog/object-storage/> Nov. 25, 2020. (Year: 2020).
"Adding Objects to Versioning—Enabled Buckets", from https://docs.aws.amazon.com/AmazonS3/latest/dev/AddingObjectstoVersioningEnabledBuckets.html, (Oct. 2, 2019).
"Configure a Pod to Use a ConfigMap", from https://kubernetes.io/docs/tasks/configure-pod-container/configure-pod-configmap/, (Oct. 2, 2019).
"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.
"Deployments", from https://kubernetes.io/docs/concepts/workloads/controllers/deployment/, (Oct. 2, 2019).
"Retrieving Object Versions", from https://docs.aws.amazon.com/AmazonS3/latest/dev/RetrievingObjectVersions.html, (Oct. 2, 2019).
"Set up Cluster Federation with Kubefed—Kubernetes", from https://v1-14.docs.kubernetes.io/docs/tasks/federation/set-up-cluster-federation-kubefed/, (Apr. 17, 2020).
"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.
"Volumes", from https://kubernetes.io/docs/concepts/storage/volumes/, (Oct. 2, 2019).
AWS Storage Gateway "Creating an NFS file share" (Oct. 28, 2020) from https://docs.aws.amazon.com/storagegateway/latest/userguide/CreatingAnNFSFileShare.html, pp. 1-10.
B Tree Indexes. http://web.csulb.edu/-amonge/classes/common/db/B TreeIndexes.html, Aug. 4, 2018, pp. 1-7 (2018).
Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec.-May 2016; pp. 1-5.
Michael Bose "A guide on how to Mount Amazon S3 as a Drive for Cloud File Sharing" (Jun. 17, 2020) from https://www.nakivo.com/blog/mount-amazon-s3-as-a-drive-how-to-guide, pp. 1-27.
Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug.-Dec. 2015; pp. 1-6.
Object Storage—Gluster Docs, "SwiftOnFile" (Oct. 28, 2020) from https://staged-gluster-docs.readthedocs.io/en/release3.7.0beta1/Administrator%20Guide/Object%20Storage, pp. 1-2.
Stopford. Log Structured Merge Trees. http://www.benstopford.com/2015/02/14/ log-structured-merge-trees, 2015, pp. 1-8 (2015).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
"AWS Pricing"; Amazon Web Services; https://aws.amazon.com/pricing/; Webpage accessed on Jun. 23, 2021; pp. 1-9.
"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.
"Managed VMware Cloud Services"; VMware; https://cloud.vmware.com/providers/managed-services-provider; Webpage accessed on Jun. 23, 2021; pp. 1-5.
"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.
"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.
"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.
"Storage Tiering"; VMWARE Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.
"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.
"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.
Cano, Ignacio, et al. "Curator: Self-Managing Storage for Enterprise Clusters" (Mar. 27, 2017), from https://www.usenix.org/conference/nsdi17/.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).

(56) References Cited

OTHER PUBLICATIONS

Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
"Adding objects to versioning-enabled buckets—Amazon Simple Storage Service.pdf," https://docs.aws.amazon.com/AmazonS3/latest/userguide/AddingObjectsto VersioningEnabledBuckets.html, pp. 1-2.
"Method:disks.get|Compute Engine Documentation|Google Cloud. pdf," https://cloud.google.com/compute/docs/reference/rest/v1/disks/get, pp. 1-17.
"NetApp ONTAP 9.7 Announced—StorageReview.com," (Jun. 14, 2019), https://www.peakresources.com/netapp-ontap-9-6-release-notes-and-thoughts/, pp. 1-5.
"PUT Object|Cloud Storage|Google Cloud," https://cloud.google.com/storage/docs/xml-api/put-object, pp. 1-3.
"Retrieving object versions from a versioning-enabled bucket—Amazon Simple Storage Service.pdf," https://docs.aws.amazon.com/AmazonS3/latest/userguide/RetrievingObjectVersions.html, pp. 1-3.
"Xml and More: OCI?Knowing Object Storage Basics" (Jan. 13, 2019), http://xmlandmore.blogspot.com/2019/01/ociknowing-object-storage-basics.html, pp. 1-6.
Amazon Simple Storage Service User Guide API Version Mar. 1, 2006 (Year: 2006).
Ballard, Brit, "Back to Basics: Writing SQL Queries," (Apr. 21, 2014), https://thoughtbot.com/blog/back-to-basics-sql, 1-17 pages.
Dellemc, "Elastic Cloud Storage (ECS)," (Aug. 2017), https://repository.usc.edu/sites/repository.usc.edu/files/ecs_overview.pdf. pp. 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
F5, "Enable Single Namespace for VMware Horizon with View Deployments," https://www.f5.com/pdf/solution-center/vmware-single-namespace-overview.pdf, pp. 1-2.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Guess A.R., "Cloudian HyperStore 7 Multi-Cloud Data Management Unifies Public Cloud and On-Premises Storage—Dataversity," (Jan. 29, 2018), https://www.dataversity.net/cloudian-hyperstore-7-multi-cloud-data-management-unifies-public-cloud-premises-storage/, pp. 1-4.
"How to use Indexing to Improve Database Queries," https://dataschool.com/sql-optimization/how-indexing-works/, pp. 1-12.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGrid Solves Your Unstructured Data Management Problems|NetApp Blog," (Apr. 17, 2019), https://www.netapp.com/blog/storagegrid-solves-your-unstructured-data-management-problems/, pp. 1-6.
Oracle Multimedia User's Guide, 12c Release 1 (12.1), E17697—Jul. 9, 2014 (Year 2014).
Oracle SQL Developer User's Guide, Release 1.5, E12152-08, Jul. 2014 (Year: 2014); pp. 1-128.
Patel Kiran, Goynes Eddie, "Lower latency with AWS Elemental MediaStore chunked object transfer|AWS Media Blog," (Jul. 2, 2019), https://aws.amazon.com/blogs/media/lower-latency-with-aws-elemental-mediastore-chunked-object-transfer/, pp. 1-6.
Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.
Sonobuoy, "Sonobuoy," https://sonobuoy.io/, 1-6 pages.
VM ware, "VMware Cloud Director Object Storage Extension Documentation.pdf," https://docs.vmware.com/en/VMware-Cloud-Director-Object-Storage-Extension/index.html, pp. 1-3.
VMware, "Introducing HCX Enterprise—Cloud Blog—VMware," (Aug. 8, 2019), https://blogs.vmware.com/cloud/2019/08/08/introducing-hcx-enterprise/, pp. 1-6.
VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Wikipedia, "Chunked transfer encoding," https://en.wikipedia.org/wiki/Chunked_transfer_encoding, pp. 1-4.
Woodward Liz, "What Is Elastic Cloud Storage—A Guide to ECS in 2022," https://www.cloudwards.net/what-is-elastic-cloud-storage/, pp. 1-8.
Sonobuoy Overview, https://sonobuoy.io/docs/v0.56.10/.
"Choosing a load balancer for your object storage environment", NetApp 2020.
"NetApp StorageGrid", NetApp 2022.
"Tutorial: Transferring data from on-premises storage to Amazon S3 in a different AWS account", https://docs.aws.amazon.com/datasync/latest/userguide/s3-cross-account-transfer.html, accessed Dec. 12, 2022.
"What is AWS Data Sync?", https://docs.aws.amazon.com/datasync/latest/userguide/what-is-datasync.html, accessed Dec. 12, 2022.
Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.
Cloudian, "HyperBalance Load Balancer", https://cloudian.com/products/hyperbalance/, accessed Dec. 12, 2022.
Cloudian, "On-Premises Object Storage: Building S3 in Your Backyard", https://cloudian.com/guides/hybrid-it/on-premises-object-storage/, accessed Dec. 12, 2022.
Cloudian, "S3 Backup: The Complete Guide", https://cloudian.com/blog/s3-backup-the-complete-guide/, accessed Dec. 12, 2022.
Cloudian, "Simple, Secure, Scalable. S3-Compatible, Cloud Native Data Management", https://cloudian.com/products/hyperstore/, accessed Dec. 12, 2022.
NetApp, "StorageGrid: Smart, fast, future-proof object storage", https://www.netapp.com/data-storage/storagegrid/, accessed Dec. 12, 2022.
Wambler, Choosing a Primary Key: Natural or Surrogate? http://www.agiledata.org/essays/keys.html, 2018, pp. 1-4 (2018).
Final Office Action on U.S. Appl. No. 17/358,967 dated Feb. 22, 2023.
Foreign Search Report on EP DTD Feb. 14, 2024.

\* cited by examiner

… ments, regions can include hundreds or thousands or more objects. Advantageously, instead of needing to scan many objects to determine whether a tier should be moved to a cloud store, a system can scan fewer regions in less time. Further, the tiering of data from local store to cloud store can be done by transferring regions instead of individual objects, further increasing efficiency and speed of the system. Moreover, the objects can be mapped to the regions a priori to speed up the transfer. Another advantage is that the commonality used for grouping into regions can be updated, making the system more flexible for users.

The present disclosure also describes sharding of object store data and metadata across multiple public clouds. The sharding of object store data and metadata enables multi-cluster systems to share data regions across clusters. Advantageously, the sharding further improves system performance and data transfer off on-premise systems and onto cloud storage.

The present disclosure also describes information lifecycle management across local and multiple public clouds using frequency and age-based information. An object in the local store may or may not be eligible for tiering. Advantageously, designating objects for transfer to a cloud can remove less used and older objects from the local store. One way to designate eligibility for an object as eligible for tiering to a cloud store is to explicitly specify a tier during an object put. Another way to indicate eligibility is using a bucket lifecycle policy by specifying a transition rule. Yet another way to designate eligibility of an object for tiering is to have a system-driven mechanism to tier based on the coldness of objects, meaning based on the access of the object. Accordingly, the present disclosure provides local object cache for newer and frequently accessed objects while older and less-accessed objects are located in a cloud-based store after transfer from the local object store.

The present disclosure provides the ability to tier to any type of storage endpoint, including an S3 compliant endpoint such as a bucket. Some embodiments can include an endpoint registration process in which an endpoint can be registered to receive transfers of data and metadata from regions stored in the local store.

The present disclosure provides technical solutions that enable the local store system to transfer objects as tiers to cloud store. A local store system may be configured to group objects into regions that enable transfer of data and metadata from the local store to cloud storage, thereby providing effective and convenient management of local storage including scaling possible storage to limits only based on how many cloud stores are available.

Object Virtualization Technology and Environment

Figure 1:
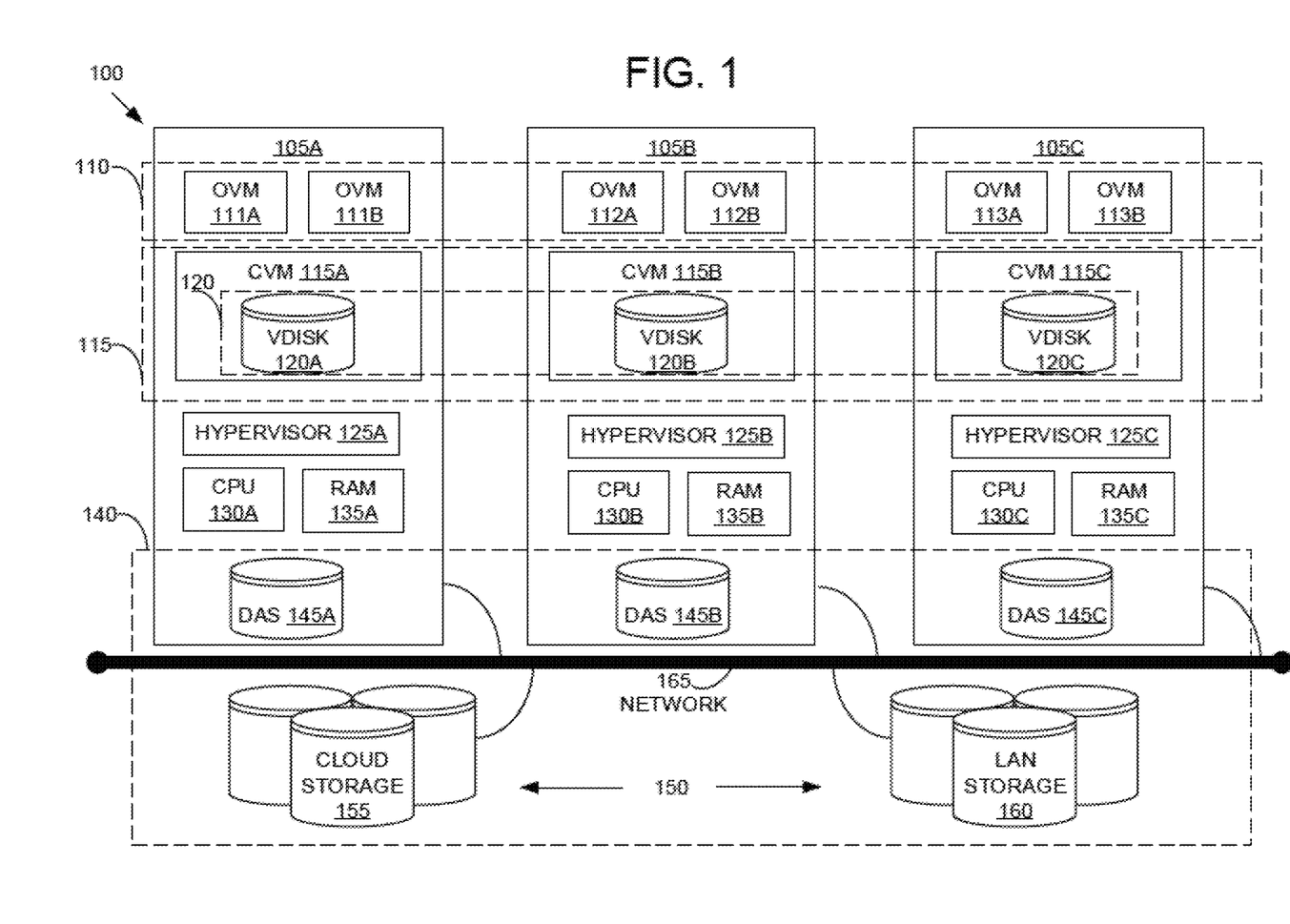

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMs 135 and/or the storage pool 140. The virtualization of the underlying hardware is described below.

In some embodiments, the CVMs 115 may be configured to run a distributed operating system in that each of the CVMs 115 run a subset of the distributed operating system. In some embodiments, an operating system such as the Nutanix Operating System ("NOS"), the CVMs 115, a hypervisor, and the underlying storage of the nodes (e.g., nodes 105) on which the CVMs 115 are running, form one or more storage clusters (e.g., "NOS clusters"). In some embodiments, the one or more NOS clusters include greater than or fewer than the CVMs 115. In some embodiments, each of the CVMs 115 run a separate, independent instance of an operating system. In some embodiments, the one or more NOS clusters may be referred to as a storage layer.

In some embodiments, the OVMs 110 form an OVM cluster. OVMs of an OVM cluster may be configured to share resources with each other. The OVMs in the OVM cluster may be configured to access storage from the NOS cluster using one or more of the vdisks 120 as a storage unit. The OVMs in the OVM cluster may be configured to run software-defined object storage service, such as Nutanix Objects™ or Nutanix Buckets™. The OVM cluster may be configured to create buckets, add objects to the buckets, and manage the buckets and objects. In some embodiments, the OVM cluster include greater than or fewer than the OVMs 110.

Multiple OVM clusters and/or multiple NOS clusters may exist within a given virtual computing system (e.g., the virtual computing system 100). In some embodiments, the virtual computing system 100 is a hyperconverged infrastructure (HCI) of one or more OVM clusters and one or more NOS clusters. The one or more OVM clusters may be referred to as a client layer or object layer. The OVM clusters may be configured to access storage from multiple NOS clusters. Each of the OVM clusters may be configured to access storage from a same NOS cluster. A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single stand-alone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Multi-Cluster Storage

Objects are collections of unstructured data that includes object data and object metadata of the object or the object data. A bucket is a logical construct with a flat hierarchy that provides object access to users. A deployment can have multiple buckets. Each object may be stored as opaque data (e.g., no regard to format of the data). Each object may be sharded/striped/chunkified. Each object or object shard may be assigned to one bucket. Each bucket may have a (e.g., globally) unique name. Each object in a bucket may have a name that is unique to the bucket. Thus, each object may have a unique name when addressed together with the parent bucket of the bucket.

Object storage service (OSS), is a layered service being built over NOS. OSS uses the power of the NOS offering and builds an efficient and scalable object store service on top. External users (e.g., clients, client devices or client applications) may access OSS through an application programming interface (API). The API may be a REST (Representational State Transfer) HTTP interface. The OSS may be hosted on or represented by an API endpoint (e.g., an HTTP endpoint, server uniform resource locator (URL), etc.). Users read, write, or delete objects to the OSS using, for example, GET, PUT, POST, and DELETE commands (e.g., calls, requests, actions, etc.). In some embodiments, an entire object is written and partial writes, appends or overwrites are not permitted. For reads and writes, data flows through OSS components before being stored in NOS storage. The OSS may run on one or more OVMs. The OSS is herein referred to as the object layer.

Each bucket is backed by one or more vdisks (e.g., the vdisks 120 in FIG. 1), which are backed by an underlying storage (e.g., the storage pool 140 or a component thereof, such as a NOS container, a SAN, or a NAS). In some embodiments, a vdisk appears to the bucket, a CVM, or other VM, as a SAN or NAS storage. The bucket or CVM reads or writes to the vdisk using, for example, SCSI or NFS protocol. In some embodiments, the vdisk encapsulates the SCSI commands in iSCSI and sends the iSCSI commands across the network to the SAN hardware that is backing the vdisk. In some embodiments, the vdisk encapsulates and/or forwards the NFS commands across the network to the NAS storage that is backing the vdisk.

Regions from vdisks are allocated to buckets. A region provides the high-level mapping between at least one of an object or a bucket and the corresponding locations on a vdisk (e.g., a vDisk ID, vdisk offset, and vdisk length). Vdisks may be subdivided (e.g. chunked) into multiple fixed-size regions. A region can include portions (e.g., portions, chunks, blocks, locations) of multiple vdisks.

Figure 2:
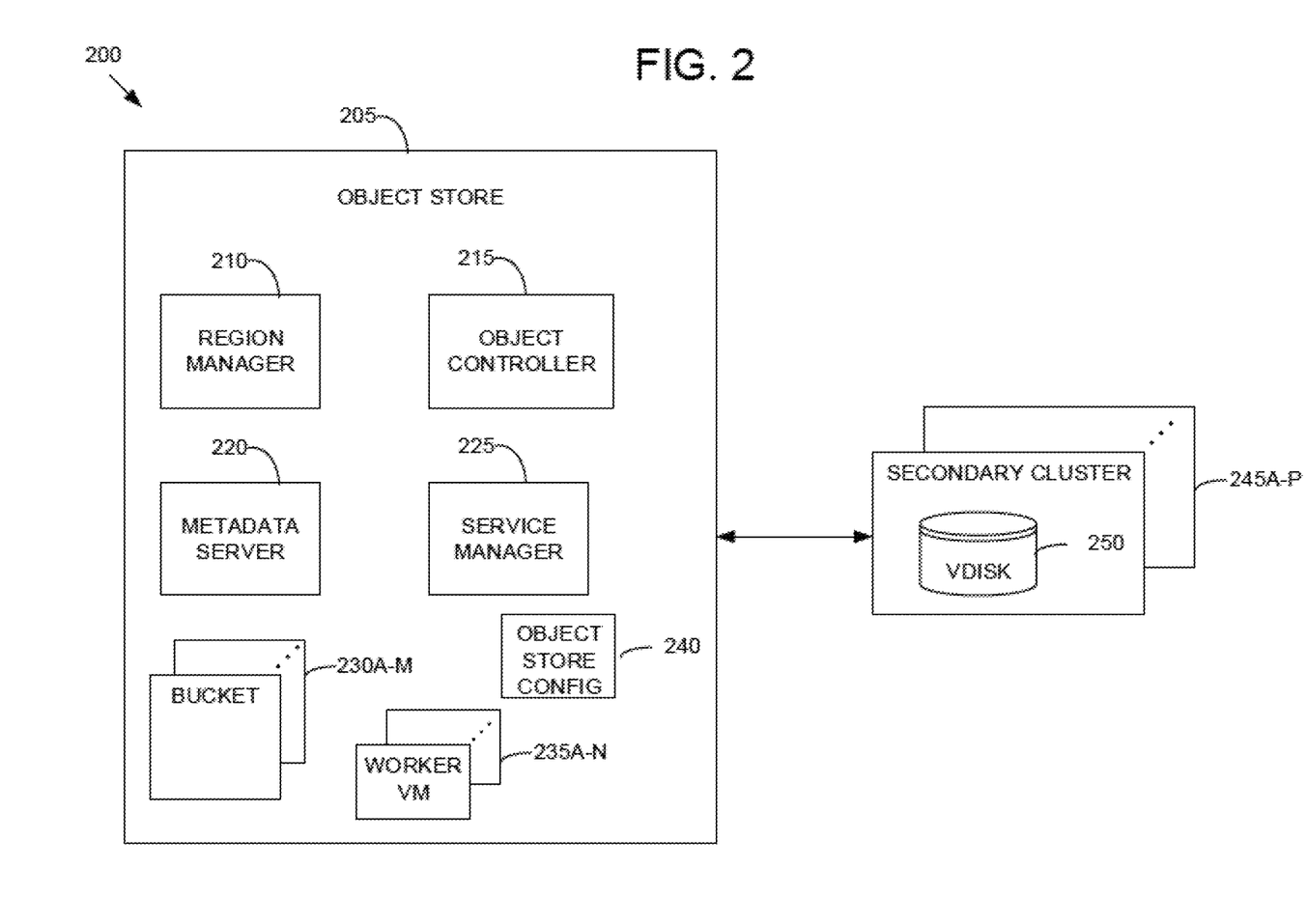

FIG. 2 illustrates a multi-cluster storage system 200. The multi-cluster storage system 200 includes an object store (e.g., object store service) 205. The object store 205 includes a region manager (RM) 210, an object controller (OC) 215, a metadata server (MS) 220, a service manager 225, multiple buckets 230A-M, multiple worker VMs 235A-N, and an object store configuration (config) 240. The object store 205 is hosted on one or more nodes of a primary cluster. In some embodiments, the primary cluster is a hyperconverged infrastructure (HCI) cluster of a compute cluster and a storage cluster. In some embodiments, compute cluster is the OVM cluster running associated with FIG. 1 and the storage cluster is the NOS cluster associated with FIG. 1.

In some embodiments, the object store 205 is in communication with multiple secondary clusters 245A-P. Each of the secondary clusters have one or more nodes, one or more vdisks 250, and underlying storage. The object store 205 (e.g., a federation) includes the primary cluster and any secondary clusters 245A-P that have been added to the object store 205. After a secondary cluster (e.g., 245A) is added, the components can perform object storage operations (e.g., store, read, write, delete) with respect to the secondary cluster 245A as if the secondary cluster was the primary cluster that had its storage capacity increased. In some embodiments, at least one of the one or more secondary clusters 245A-P is a hyperconverged infrastructure (HCI) cluster. In some embodiments, at least one of the one or more secondary clusters 245A-P is a storage cluster (e.g., without a compute cluster). In some embodiments, at least one of the one or more secondary clusters 245A-P is cloud-based storage.

In some embodiments, the primary cluster and the one or more secondary clusters are part of a storage federated namespace. That is, each of the cluster names are unique. In some embodiments, the object store 205 is hypervisor agnostic, meaning that the object store 205 can access added secondary clusters 245A-P even if the nodes of the one or more of the secondary clusters 245A-P have different hypervisors than the nodes on the primary cluster. For example, the primary cluster may include a first hypervisor-type (e.g., a hypervisor of a first vendor) and the secondary cluster may include a second hypervisor-type (e.g., a hypervisor of a second vendor) different from the first hypervisor-type.

The region manager 210 includes a processor with programmed instructions (herein, the region manager 210 includes programmed instructions) to manage all of the object storage information on the vdisks backed by underlying storage (for both the primary cluster and the subset of secondary clusters 245A-P that have been added to the object store 205).

The region manager 210 includes programmed instructions to discover (e.g., discover, detect, identify, determine, track) existing secondary clusters 245A-P. The region manager 210 includes programmed instructions to create vdisks 250 on the existing secondary clusters 245A-P. The region manager 210 includes programmed instructions to populate the config 240 with secondary cluster details, including creating a unique store identifier (e.g., ID) for each of the secondary clusters 245A-P. The config 240 includes a unique data store identifier (e.g., ID) for each of the secondary clusters 245A-P. The data store ID can be used to lookup the secondary cluster details in the config 240, such as cluster uuid and container name/uuid. The config 240 can contain information about the newly added subset of the secondary clusters 245A-P in terms of storage capacity, free space, our soft limit of space usage on the cluster, the number and types of nodes and disks.

The region manager 210 includes programmed instructions to create new vdisks 250. Vdisks 250 previously created without the data store ID field set will be considered to be belonging to primary cluster. A new one of the vdisks 250 created after a data store ID is created for the secondary cluster (e.g., 245A) on which the new one of the vdisks 250 is running belongs to that secondary cluster.

The region manager 210 includes programmed instructions to distribute allocations of regions from vdisks 250 on different clusters 245A-P. In some embodiments, the region manager 210 includes programmed instructions to allocate space such that consumption is directly proportional to some characteristic (e.g., free disk space, latency, throughput, and the like) on the respective clusters 245A-P (e.g., weighted allocation). In order to do this, the region manager 210 can actively poll the characteristic. In some embodiments, the region manager 210 includes programmed instructions to equally allocate regions from vdisks 250 on all the clusters 245A-P (e.g., round robin allocation). In some embodiments, the region manager 210 includes programmed instructions to periodically update the allocation. The region manager 210 includes programmed instructions to allocate the regions to the buckets 230A-M. In some embodiments, the allocation of regions to buckets can be a weighted allocation or a round robin allocation. In some embodiments, first regions from vdisks 250 (e.g., previously free space) are allocated to the buckets 230A-M, and second regions from vdisks 250 are allocated to other buckets on other clusters (e.g., secondary clusters 245A-P or other clusters). In some embodiments, first regions from vdisks 250 are assigned to a first tenant and second regions from vdisks 250 are assigned to as second tenant.

In some embodiments, the region manager 210 includes programmed instructions to close any of the vdisks 250 on nodes running out of storage capacity. As soon as one of the clusters 245A-P (e.g., cluster 245A) is marked to be removed from the object store 205, the region manager 210 includes programmed instructions to stop allocating new regions and creating new ones of the vdisks 250 on that cluster 245A. In some embodiments, the region manager 210 includes programmed instructions to close open regions allocated from any of the vdisks 250 belonging to the cluster 245A marked to be removed. The region manager 210 includes programmed instructions to partition the virtual disks 250 into regions.

The object controller 215 includes a processor with programmed instructions (herein, the object controller 215 includes programmed instructions) to manage object data and coordinate metadata updates with the metadata server 220. The object controller 215 includes programmed instructions to store objects (e.g., or object portions/shards/stripes/chunks) in one or more of the buckets 230A-M (e.g., bucket 230A), for example, in accordance to the allocation determined by the region manager 210. In some embodiments, the object controller 215 includes programmed instructions to store a first object or portion of an object in a first bucket mapped to a vdisk (e.g., of the vdisks 250) belonging to a secondary cluster 245A and a second object or portion of an object in a second bucket mapped to a vdisk (e.g., of the vdisks 250) belonging to the primary cluster or a secondary cluster 245B. In some embodiments, the object controller 215 includes programmed instructions to store unique objects or portions of objects in each of one or more clusters (e.g., the objects or portions are not replicas). In some embodiments, the object controller 215 includes programmed instructions to identify the one or more regions of the one or more of the vdisks 250 that are mapped to the bucket 230A. For example, the object controller 215 can access the config 240 to determine this. In some embodiments, the object controller 215 includes processor to store objects in regions of one or more of the vdisks 250 that are mapped to the bucket 230A. In other embodiments, the bucket 230A stores the objects in regions of one or more of the vdisks 250 that are mapped to the bucket 230A. In some embodiments, the object controller 215 has programmed instructions to access (store, read, write, delete) objects in regions of one or more of the vdisks 250 that are mapped to the bucket 230A through an application programming interface (API) such as a Representational State Transfer (REST) API or a remote procedure call (RPC) API.

The object controller 215 includes programmed instructions to migrate data belonging to vdisks 250 on any of the clusters 245A-P that are to be removed from the object store 205. In some embodiments, the object controller 215 includes programmed instructions to do a pre-check for sufficient space available to migrate data from the cluster to be decommissioned (e.g., 245A) and distribute across other secondary clusters 245B-P. In some embodiments, the object controller 215 includes programmed instructions to identify regions belonging to vdisks on a cluster to be decommissioned. The object controller 215 can issue background migration tasks. In some embodiments, the object controller 215 includes programmed instructions to leverage worker VMs 235A-N (or an application/container/component associated the worker VMs 235A-N) to do map reduce processing of metadata to identify regions belonging to vdisks on a cluster to be decommissioned 245A. In some embodiments, the object controller 215 includes programmed instructions to either generate an in-memory map to figure out what vdisks belong to the to-be-removed cluster 245A or perform a reduce on the vdisk ID to figure out the region-IDs to be migrated and trigger tasks. Either of these can happen as part of a partial scan (see below). In some embodiments, the object controller 215 can leverage the existing background task to migrate data at region level as part of OC background task. In some embodiments, the object controller 215 can use a Multi-part data migrate API to migrate data parts in parallel.

In some embodiments, the object controller 215 (or some other object store component) includes programmed instructions to perform full scans (FS) or partial scans (PS) of metadata periodically to identify regions belonging to vdisks 250 on a cluster to be decommissioned (e.g., 245A). Partial scans can run periodically (e.g., every 1 hour) and generate all the migrate tasks at one time. Partial scans may not have the live offsets of the regions and the OC 215 may issue migrate on an entire region, containing zeros or non-referenced objects as well. A full scan runs performs partition-based scans and can only generate scans for regions in the partition. In some embodiments, two full scans can cover entire metadata range. In some embodiments, the full scan can skip over zeroes and garbage while issuing migrate with exact ranges to copy. In some embodiments, the object controller 215 continues to schedule scans (PS or FS) until the tasks are generated.

In some embodiments, the object store 205 includes multiple object controller 215 instances, each of which includes programmed instructions to perform the foregoing tasks by the object controller 215. In some embodiments, a number of open vdisks 250 can be determined by, or proportional to, a number of the object controller 215 instances.

The service manager 225 includes a processor with programmed instructions (herein, the service manager 225 includes programmed instructions) to serve as the endpoint for all user interface (UI) requests (e.g., from users) and manage object store instances. The service manager 225 includes programmed instructions to provide a UI to the user for adding one of the secondary clusters 245A-P to a deployed object store instance, viewing stats from the different clusters and highlight the primary cluster, and remove one of the secondary clusters 245A-P. In some embodiments, the service manager 225 includes programmed instructions to update the config 240 via the UI gateway as part of add/remove/update cluster workflows triggered from user actions in the UI. All the changes made via the UI can be stored/updated in the object store instance via the UI Gateway.

The service manager 225 includes programmed instructions to collection stats from instances. The service manager 225 includes programmed instructions to display usage and stats from the primary cluster and all the secondary clusters 245A-P in addition to the total usage. Some of the usage metrics to periodically collect from every one of the secondary clusters 245A-P are (a) used space on the object store or bucket container, (b) free space on the cluster, (c) space used by other containers. These stats need to be published to database component (e.g., key-value store) in object store periodically and integrated with the UI Gateway workflow for publishing to the UI. There are two approaches to access this information from Buckets. One way is to use an API to get container information from the primary cluster and all the secondary clusters 245A-P. This makes a REST call to the Virtual IP of the clusters and queries components from the underlying cluster. Another approach would be to add an API in the vdisk proxy that would send an RPC from the vdisk proxy to other components of the cluster to get the requested information.

The service manager 225 includes programmed instructions to generate alerts (e.g., regarding low free space on the primary cluster or any of the secondary clusters 245A-P). In some embodiments, the service manager 225 includes programmed instructions to determine a soft limit per cluster (e.g., on the primary cluster or any of the secondary clusters 245A-P). This could either be assigned internally or requested as optional input from the user as part of the add cluster. An alert can be generated once space consumption crosses the soft limit (e.g., limit threshold, etc.) quota on the primary cluster or any of the secondary clusters 245A-P. In some embodiments, the object store 205 can however continue using space after alerting the user.

In some embodiments, the added secondary cluster (e.g., 245A) might not be dedicated for the object store 205. It might be running some other VMs or services, and, hence, the object store 205 shares the capacity with other consumers. In some embodiments, the service manager 225 includes programmed instructions to monitor (e.g., monitor, watch, track, identify, determine, detect) the free space left on the secondary cluster e.g., 245A even if the object store 205 is within the soft limit. In some embodiments, a second limit may be set based on the free space left on the secondary cluster e.g., 245A.

In some embodiments, the service manager 225 includes programmed instructions to generate an alert if a data migration is taking longer than a threshold time. The data migration may be associated with decommissioning one of the secondary clusters (e.g., 245A). In some embodiments, the service manager 225 alerts the user if the secondary clusters 245A removal from the object store 205 is taking longer than expected for if it seems in a stuck state. The service manager 225 can set an upper limit for data migration operation out of the secondary clusters 245A.

In some embodiments, the service manager 225 includes programmed instructions to generate an alert if one of the secondary clusters (e.g., 245A) is unreachable for longer than a threshold time. In some embodiments, the worker VMs 235A-N periodically check that each of the secondary clusters 245A-P that have been added to the object store 205 are reachable. For example, for any spike in the network latency over a period of where latency observed is above a threshold of for example 2 ms, the service manager 225 issues an alert.

In some embodiments, the service manager 225 includes programmed instructions to create NOS containers. In some embodiments, the service manager 225 (or some other component of the object store 205) includes programmed instructions to perform pre checks for adding one or more of the secondary clusters 245A-P like whitelisting the IP/port for the vdisk/vdisk proxy/secondary cluster and other settings like cluster DSIP and VIP for ensuring network reachability and connectivity. In some embodiments, the service manager 225 includes programmed instructions to create worker VMs on the primary cluster.

The metadata server 220 includes a processor with programmed instructions (herein, the metadata server 220 includes programmed instructions) to contain all the metadata around an object store deployment (e.g. buckets, objects, etc.). The metadata server 220 includes programmed instructions to leverage a key-value store for storage of the metadata. In some embodiments, the metadata server 220 includes programmed instructions to store the config 240 in the key-value store.

Object Tiering

Figure 3:
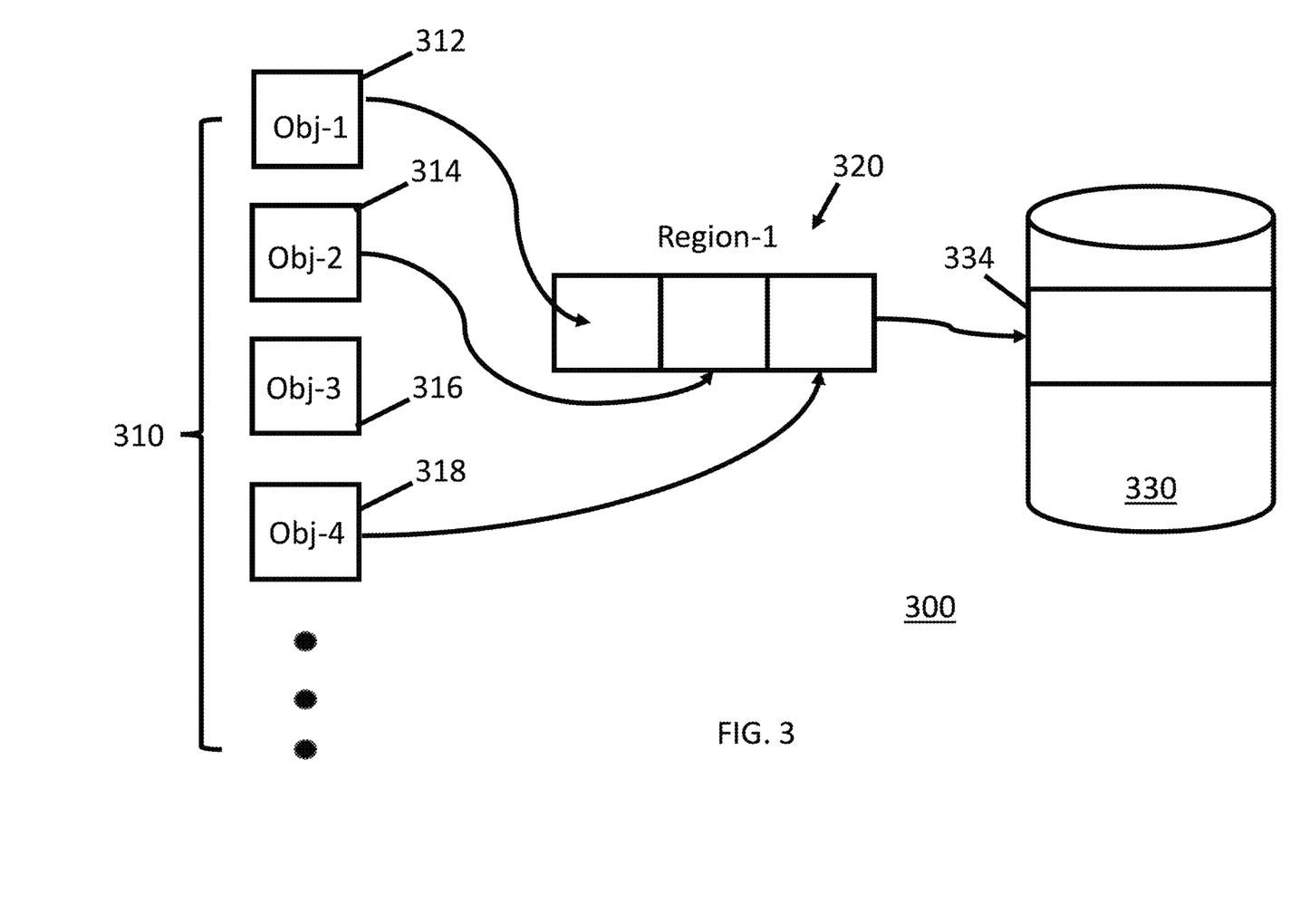

FIG. 3 illustrates objects 310 in a local store of an on-premise system 300. Objects 310 include objects 312, 314, 316, 318, and possibly many more objects. According to an exemplary embodiment, objects 312, 314, and 318 are mapped to a region 320 because of some commonality. In exemplary embodiments, the mapping is done when the object is put (when it is written to an object store) and not during the scan for tiering objects out. The commonality resulting in grouping to region 320 can be that objects 312, 314, and 318 are scheduled to expire in the same month or the same week. Objects 312, 314, and 318 can be mapped to region 320 because they all have been accessed within a certain range of time. For example, objects 312, 314, and 318 can all be most recently accessed between 30 and 60 days ago and could normally be scheduled for expiration and removal from the local store. The on-premise system can designate objects as eligible for transfer due to a number of reasons.

Region 320 maps the data from objects 312, 314, and 318 to a local storage 330 into sequential memory spaces 334. Mapping of data objects is done a priori when the data objects are written. Tiering data is specified relative to objection creation time. When transferring the data from objects 312, 314, and 318 in the local storage 330 to a cloud storage, the reading of memory spaces that are sequential is done much faster than if the data were to be stored non-sequentially. System 300 can save space in its memory by transferring out eligible data, and, due to the grouping of objects into regions and storing of regions in sequential memory locations in the local store, transfer of the objects to cloud storage can be done quickly and efficiently by region in the local store 330.

Figure 4:
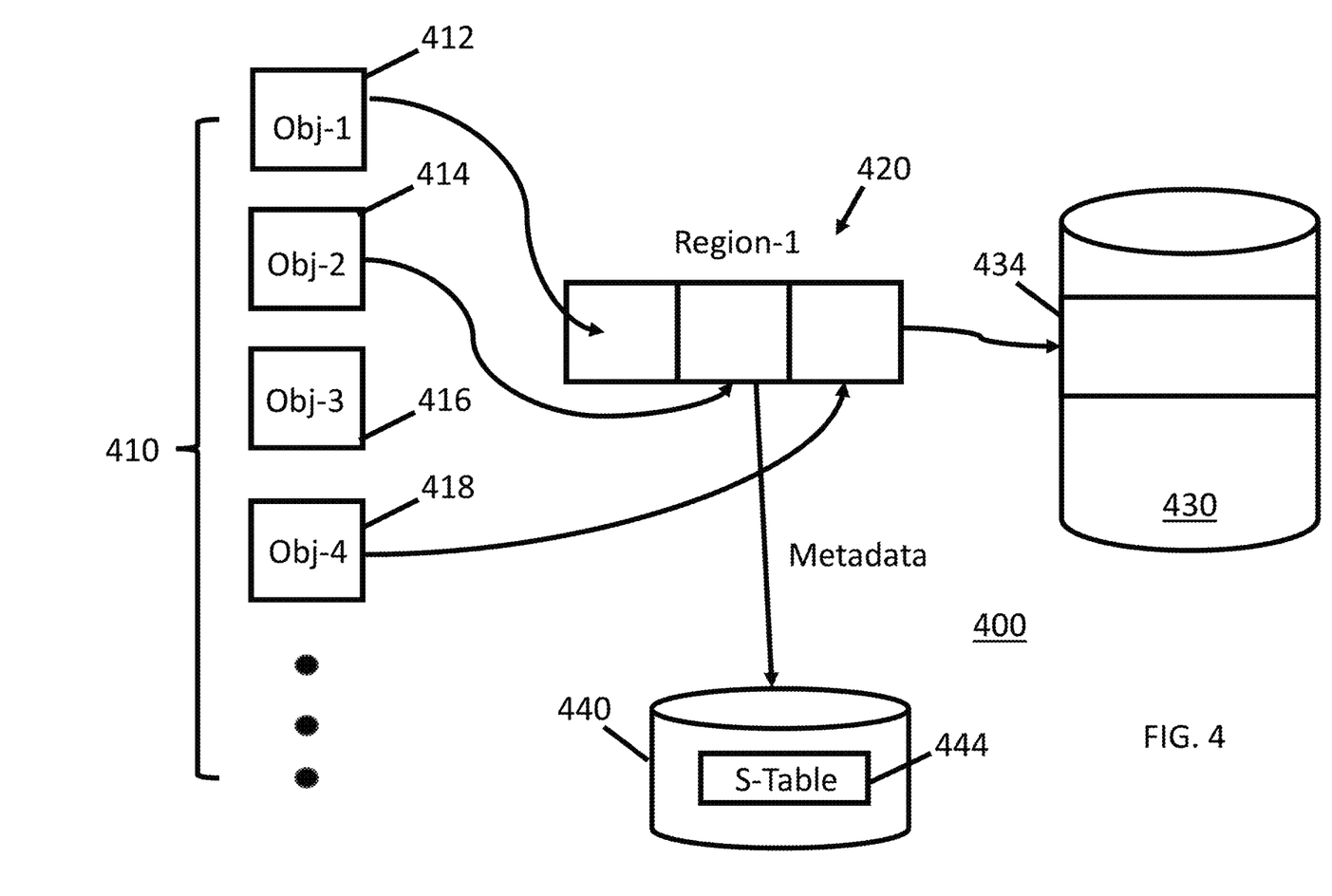

FIG. 4 illustrates data objects 410 in a local store of an on-premise system 400. Data objects 410 include data objects 412, 414, 416, 418, including possibly billions of data objects. The data objects include associated metadata. According to an exemplary embodiment, data objects 412, 414, and 418 are mapped to a region 420 because of some commonality such as a common tiering date. A common tiering date is a date or a date range, such as a month, when a data object is to be moved from the local store to a cloud store. In some embodiments, the common tiering date is set based on access frequency or recency. For example, a longer time since a data object has been accessed, in such an arrangement, causes the common tiering date to be sooner. In such a system, data objects that are accessed infrequently are tiered or moved from the local store to the cloud store. For example, data objects 412, 414, and 418 can all be most recently accessed between 30 and 60 days ago and could normally be scheduled for expiration and removal from the local store. Access can be tracked at an object level, a region level, at a lifecycle filtering criteria level, or at lifecycle rule level. The on-premise system can designate objects as eligible for transfer due to a number of reasons.

Region 420 maps the data from data objects 412, 414, and 418 to a local storage 430 into sequential memory spaces 434. When transferring the data from data objects 412, 414, and 418 in the local storage 430 to a cloud storage, the reading of memory spaces that are sequential is done much faster than if the data were to be stored non-sequentially.

Metadata associated with data objects 412, 414, and 418 can be stored in a database 440 in a structure such as an s-table 444. The metadata in s-table 444 can be transferred to the cloud storage at the same time as when transferring data from data objects 412, 414, and 418 in the local storage 430 to the cloud storage. In some embodiments, the metadata in database 440 is sent to the cloud storage separately from corresponding data objects (e.g., at a different time, based on a different tiering date or other commonality specific to metadata, etc.).

Figure 5:
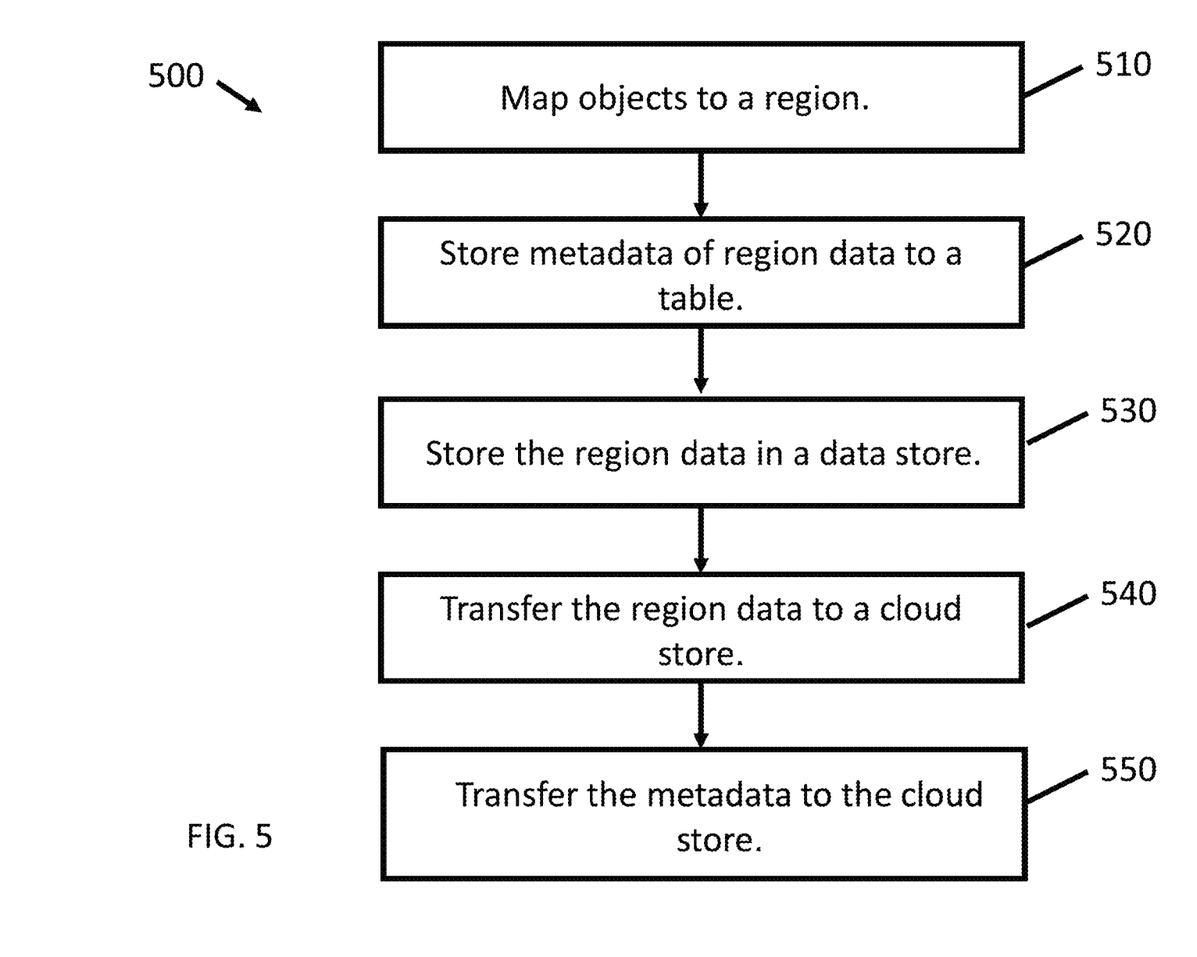

FIG. 5 illustrates a method 500 including example operations performed by an object tiering system. Additional, fewer, or different operations may be performed depending on the embodiment. Method 500 includes mapping objects to a region in operation 510, storing metadata for the data in a region to a table in an operation 520, storing object data in regions to a data store in operation 530, transferring region data from the data store to a cloud store in operation 540, and transferring metadata to the cloud store in operation 550.

Mapping of data objects to a region in operation 510 can be done by grouping objects having similar expiration times, grouping objects having similar access frequencies, grouping objects according to a defined (e.g., lifecycle) policy, grouping objects by a type of object (e.g., a write-once-read-many (WORM) object), and grouping objects according to other characteristics. Grouping objects based on expiration times collects objects that are scheduled to expire or be deleted in a similar time frame so that older data objects can be transferred out of the data store together. Grouping objects based on similar access frequencies collects objects based on how often the objects are accessed. Grouping objects based on a defined policy gathers objects based on a lifecycle management policy defined for the data store.

In some embodiments, the data objects are ingested (e.g., received, stored, imported, etc.) in/into a data store (e.g., a local store such as the local storage 330, a cloud store, etc.). In some embodiments, the mapping of the data objects happens in-line with the ingestion. That is, as each data object is received, it can be mapped to one of one or more regions. For example, a first data object may be ingested and mapped to a first region, then a second data object may be ingested and mapped to a second region different from the first region, then a third data object may be ingested but not mapped to any region because it does not meet filtering criteria. In some embodiments, the mapping of the data objects happens as a post-ingestion process. That is, all of the data objects are ingested, and then each of the data objects can be mapped to one or more regions. In some embodiments, the post-ingestion process happens before the region is transferred or migrated or scheduled to be transferred or migrated.

In an exemplary embodiment, users can set a lifecycle policy (e.g., lifecycle rule, lifecycle policy rule, etc.) on a bucket (e.g., a database backing the bucket), and objects in the bucket may match a particular rule in the policy. In some embodiments, the lifecycle policy includes a lifecycle identifier (ID) by which the processor or other component may identify the lifecycle policy. In some embodiments, the lifecycle policy includes a filter/filtering criteria that may specify a criteria that an object is to satisfy in order for the lifecycle policy to apply to the object. In some embodiments, the lifecycle policy includes one or more of a tiering date for transferring the object to an endpoint, an endpoint (e.g., a cloud store, a second bucket in the cloud store, a second database backing the second bucket, etc.), an expiration date, or other commonality. In some embodiments, each aspect of the lifecycle policy (e.g., the lifecycle ID, the filtering criteria, the tiering date, the endpoint, the expiration date, and the like) is a commonality (e.g., a commonality type). One example of the lifecycle policy only specifies object expiration actions and if an object satisfies an expiration criterion for a matched rule (e.g., the rule says delete objects with a prefix "logs" that are older than 30 days), it is deleted. In some embodiments, the intention of this deletion is to save space on-premises. However, another way to save space is to first tier away such objects to cloud (e.g., S3) and delete them later. This keeps the objects around longer while still ensuring that the local object store cluster does not fill up.

In some embodiments, different versions of an object are mapped to, or otherwise included in, a same region regardless of whether each of the versions are eligible to be transferred/migrated to a different tier (e.g., regardless of whether the different versions have a same tiering date or other commonality). For example, with respect to FIG. 3, if the object 312 is a first version of an object and has a first tiering date, the object 314 is a second version of the object and has a second, different tiering date, and any object having the first expiration date region 320 is mapped to the region 320, then both of the object 312 and the object 314 are mapped to the region 320. In the example, upon reaching the first tiering date, the object 312 is eligible to be transferred and the object 314 is not eligible to be transferred. In some embodiments, upon reaching the first tiering date, the object 312 is transferred from the region 320 to the cloud store, whereas the object 314 is not transferred. In some embodiments, upon reaching the first tiering date, both of the object 312 and the object 314 are transferred from the region 320 to the cloud store. In some embodiments, upon reaching the first tiering date, neither of the objects 312 and 314 is transferred, and upon reaching the second tiering date, both of the object 312 and the object 314 are transferred from the region 320 to the cloud store.

Storing metadata for the data in a region to a table in operation 520 can be done by locating metadata from the data objects in a table data structure in memory. The table data structure can then be transferred in whole when the object tier is moved to cloud storage. The metadata may be stored in other kinds of data structures.

Storing object data in regions to a data store (e.g., a database) in operation 530 can include mapping data objects to sequential locations in the data store. Locating data objects in sequential addresses helps in transferring the data to the cloud store. Sequentially stored data is read faster than non-sequential data. In some embodiments, operations 510 and 530 happen in parallel. In some embodiments, operation 510 happens after operation 530.

In operation 540, region data (e.g., object data, region data, etc.) is transferred (e.g., sequentially transferred or otherwise communicated) from the data store to a cloud store in operation 540. By locating data at a cloud store, the data system frees up memory for new data objects and more often used objects. In some embodiments, the data is transferred from a local store to the cloud store. In some embodiments, the data is transferred from another cloud store to the cloud store. In some embodiments, the data is transferred from one tier (e.g., faster access, more expensive tier) of the cloud store to another tier (e.g., slower access, less expensive tier) in the cloud store. In an exemplary embodiment, cascading of tiering can happen from a data store to a cloud store (e.g., an S3 AWS cloud) and then moves from the cloud store to another cloud store (e.g., a Microsoft Azure cloud) or to another tier in the cloud store. The objects can be cascaded between public clouds, too.

Transferring the metadata to the cloud store in operation 550 can be done by a read operation that copies the metadata from the data store to the cloud store. Similar to the data object transfer, the transfer of the metadata in the region is done quickly and efficiently because it has been stored as a group in a data store (e.g., the table). As with the data objects, moving metadata to a cloud store makes room for storage in the data store.

Figure 6:
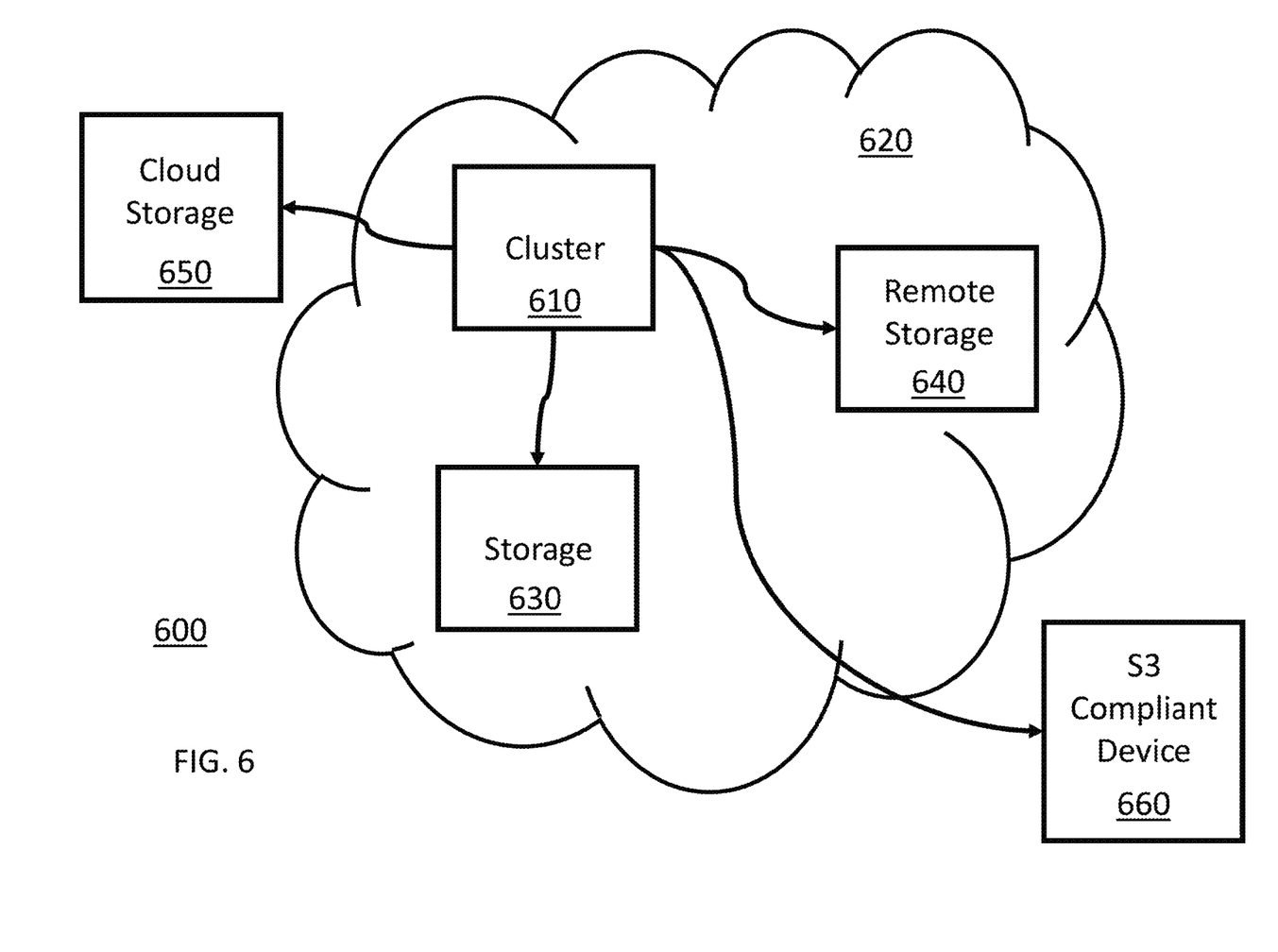

FIG. 6 is a system 600 having a cluster 610 within a cloud 620 including storage 630 and remote storage 640. Cluster 610 is communicatively connected to cloud storage 650 and an S3 compliant device 660. In the system 600, cluster 610 includes a processor on a node that is programmed to manage data objects stored in storage 630 and remote storage 640 as well as cloud storage 650 and the S3 compliant device 660. Regions of data objects can be moved or tiered as a group from storage 630 to cloud storage 650. Similarly, the processor can direct tiering of regions from storage 630 to the compliant device 660.

The system 600 can be a part of a multi-cluster system having multiple clusters to multiple local stores, remote stores, and cloud stores. Whether in a singular cluster arrangement or a multi-cluster arrangement, system 600 can include the object tiering functionalities described with respect to FIGS. 3-5. As such, data objects in system 600 can be scanned (e.g., bucket scan, database scan, table scan, index scan, etc.) for grouping into regions according to a system policy for tiering, a date threshold for tiering, or access frequency characteristics. Once the data objects are mapped to regions, they can more efficiently and quickly be transferred from local stores to cloud stores like AWS S3 stores or other cloud-based stores. Advantageously, the object tiering technique enables the local store to have an infinite amount of storage because regions of data objects are continually being transferred to cloud stores before the local store can be filled.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An object tiering system for tiering objects including tiering from a data store to a cloud store, the system comprising:
    a processor and a memory having stored instructions that, when executed by the processor, cause the processor to:
    ingest a first plurality of data objects in the data store;
    map a second plurality of data objects having a common tiering date to a region, wherein the mapping is done a priori when each data object is ingested or at a first time before the common tiering date, wherein the common tiering date is a second time for transferring the second plurality of data objects from the data store to the cloud store, wherein the first plurality of objects includes the second plurality of objects; and
    upon reaching the common tiering date, transfer the region to the cloud store.

2. The system of claim 1, wherein the data store is a local store.

3. The system of claim 1, wherein the instructions, when executed by the processor, further cause the processor to:
    map metadata associated with the second plurality of data objects to a metadata region based on a common metadata tiering date; and
    transfer the metadata region to the cloud store upon reaching the common metadata tiering date.

4. The system of claim 1, wherein the common tiering date is based on object access time.

5. The system of claim 1, wherein the common tiering date is part of a lifecycle policy.

6. The system of claim 5, wherein the instructions, when executed by the processor, further cause the processor to map the second plurality of data objects having the lifecycle policy to the region.

7. The system of claim 1, wherein the region having the mapped data object is stored in a plurality of sequential locations in the data store, and wherein transferring the region to the cloud store comprises reading the region from the plurality of sequential locations.

8. A method comprising:
    ingesting a first plurality of data objects in a data store;
    mapping a second plurality of data objects having a common tiering date to a region, wherein the mapping is done a priori when each data object is ingested or at a first time before the common tiering date, wherein the common tiering date is a second time for transferring the second plurality of data objects from the data store to a cloud store, wherein the first plurality of objects includes the second plurality of objects; and
    upon reaching the common tiering date, transferring the region to the cloud store.

9. The method of claim 8, further comprising:
    map metadata associated with the second plurality of data objects to a metadata region based on a common metadata tiering date; and
    transfer the metadata region to the cloud store upon reaching the common metadata tiering date.

10. The method of claim 8, wherein the common tiering date is based on object access time.

11. The method of claim 8, wherein the common tiering date is part of a lifecycle policy.

12. The method of claim 11, further comprising mapping the second plurality of data objects having the lifecycle policy to the region.

13. The method of claim 8, wherein the region having the mapped data object is stored in a plurality of sequential locations in the data store, and wherein transferring the region to the cloud store comprises reading the region from the plurality of sequential locations.

14. A non-transitory computer-readable medium comprising computer-executable instructions embodied thereon that, when executed by a processor, cause the processor to perform a process comprising:
    ingesting a first plurality of data objects in a data store;
    mapping a second plurality of data objects having a common tiering date to a region, wherein the mapping is done a priori when each data object is ingested or at a first time before the common tiering date, wherein the common tiering date is a second time for transferring the second plurality of data objects from the data store to a cloud store, wherein the first plurality of objects includes the second plurality of object; and
    upon reaching the common tiering date, transferring the region to the cloud store.

15. The medium of claim 14, wherein the data store is a local store.

16. The medium of claim 14, wherein the instructions, when executed by the processor, cause the processor to perform the process further comprising:
    mapping metadata associated with the second plurality of data objects to a metadata region based on a common metadata tiering date; and
    transferring the metadata region to the cloud store upon reaching the common metadata tiering date.

17. The medium of claim 14, wherein the common tiering date is based on object access time.

18. The medium of claim 14, wherein the common tiering date is part of a lifecycle policy.

19. The medium of claim 18, wherein the instructions, when executed by the processor, cause the processor to perform the process further comprising mapping the second plurality of data objects having the lifecycle policy to the region.

20. The medium of claim 14, wherein the region having the mapped data object is stored in a plurality of sequential locations in the data store, and wherein transferring the region to the cloud store comprises reading the region from the plurality of sequential locations.

* * * * *